Patented June 9, 1925.

1,540,922

UNITED STATES PATENT OFFICE.

ALEXANDRE SACHA BLACHOROVITCH, OF PARIS, FRANCE, ASSIGNOR TO HENRY GORAN BRALOWER AND MORRIS BRALOWER, BOTH OF NEW YORK, N. Y.

AGGLOMERATED MATERIAL AND PROCESS FOR MAKING THE SAME.

No Drawing.   Application filed September 2, 1924.   Serial No. 735,480.

*To all whom it may concern:*

Be it known that I, ALEXANDRE SACHA BLACHOROVITCH, a citizen of the Russian Republic, residing at Paris, France, have invented a new and useful Improvement in Agglomerated Materials and Processes for Making the Same, of which the following is a specification.

Gelatine has already been used for agglomerating various substances and it is usual to employ another material such as bichromate of potash to render the gelatine insoluble even in hot water. Gelatine thus treated will, however, when soaked in cold water, absorb a considerable quantity of water and swell up. A material thus produced is therefore unsuitable for use out of doors or in damp places. Also such a mixture sets rapidly, thus rendering it difficult to mould or work and the product is comparatively weak as it is impossible to use more than a small proportion of the material used for hardening as otherwise it disintegrates.

According to one such process an aggregate material, and plaster of Paris is first ground together and then mixed with a warm solution of gelatine and any coagulating agent such as tannic acid, chrome alum, bichromate of potash, formaldehyde or common alum.

An object of the present invention is to provide an improved process for agglomerating various substances, differing much in character, thus enabling a solid material to be produced which is substantially non-hydroscopic, is not injured by frost, is very strong, is insoluble, and does not set quickly. Such a material is especially suitable for use out of doors and in damp places, and as made from certain substances, is suitable as an electrical insulator. It further will take a high polish, and will burn but slowly, and such a material can be sawn and nailed.

According to the present invention, the process takes place in three stages: First the aggregate, generally in the form of small particles, and plaster of Paris or its equivalent, are thoroughly mixed together; then an aqueous solution of several different kinds of gelatine is added to and thoroughly mixed with the solid materials, and finally an aqueous solution containing several different kinds of materials which will harden gelatine is added, and the whole is again thoroughly mixed. By thus operating in three stages and by using a solution of several different kinds of gelatine and a solution of several different kinds of materials which will harden gelatine, it is possible to use a larger proportion than heretofore of the hardening materials, without thereby rendering the product liable to disintegration, and the hardening takes place less rapidly than heretofore. The mixture may be moulded during a period of at least fifteen minutes after the solution of hardening materials has been added.

Presumably, each of the different kinds of gelatine coacts with a particular hardening material, so that the greater proportion of hardening material used, is properly taken care of, and does not cause the product to disintegrate as would otherwise be the case. However, regardless of the actual interaction between the constituents, the above process does result in a very superior product.

About 10 to 15 per cent, by weight, of plaster of Paris is added to the aggregate and the hardening materials above mentioned may be used.

The hardening solution should be added to the mass in such a quantity that its weight is about half the weight of the gelatine solution and the more gelatine contained in the solution, the greater will be the crushing resistance of the product. When employing a gelatine solution containing a large proportion of gelatine, it is preferable to employ a hardening solution likewise containing a large proportion of the hardening materials. In the same manner when the gelatine solution contains a small proportion of gelatine, the hardening solution likewise contains a small proportion of hardening materials.

There are many kinds of gelatine upon the market and each has its own peculiar characteristics rendering it particularly useful for certain purposes. The gelatines employed in carrying the invention into effect vary in strength and character. A strong aqueous solution which has been found to be particularly suitable contains a weight of gelatine equal to about 30 per cent of the weight of the water and is made up as follows:

| | |
|---|---|
| Water | 1000 grams or 1 litre |
| Gelatine made from bones | 100 grams |
| Gelatine made from large sinews | 80 grams |
| Gelatine made from small sinews | 60 grams |
| Refined gelatine (colle gelatine) | 40 grams |
| Gelatine (bronze) | 14 grams |
| Gelatine (silver) | 6 grams |

Many makers produce highly refined gelatines which are sold under the well-known trade names of bronze, silver and gold, the latter being the most highly refined, and the degree of refinement can only be described by use of the corresponding trade name.

A suitable hardening solution for use with a 30 per cent gelatine solution as set forth above is made from the following substances in about the proportions stated:

| | |
|---|---|
| Water | 1000 grams or 1 litre |
| Chrome alum | 76 grams |
| Potash alum | 152 grams |
| Bichromate of potash | 57 grams |
| Formaldehyde | 114 grams |

Here it is seen that the total weight of the hardening materials is about 40 per cent of that of the water.

The ingredients are thoroughly mixed at a temperature of about 15° C.

As an example of the use of the gelatine solution and hardening solution set forth above, an artificial stone brick or building block which absorbs but little water (4.2 per cent) and has a high crushing resistance (209 kilogrammes per cubic centimeter) can be made from the following materials in about the proportions stated:

| | |
|---|---|
| River or sea sand | 185 grams |
| Plaster of Paris | 20 grams |
| Gelatine solution (30 per cent) | 18 cubic centimeters |
| Hardening solution (40 per cent) | 9 cubic centimeters |

When the various materials have been thoroughly mixed they are in a semi-dry state with no excess moisture present, and are compressed into desired form, in suitable presses.

When a weaker gelatine solution is employed for example, a 25 per cent solution, the hardening solution will be about a 33 per cent solution.

With a 15 per cent gelatine solution the corresponding hardening solution will be one of about 20 per cent. The proportion of the per cent of the gelatine solution to the per cent of the hardening solution, is thus always about three to four.

The hardening materials are always employed in about the following proportions as noted from the example of hardening solution given above:

| | |
|---|---|
| Chrome alum | 4 parts by weight |
| Potash alum | 8 parts by weight |
| Bichromate of potash | 3 parts by weight |
| Formaldehyde | 6 parts by weight |

Other hardening materials, which however are not essential, such as a salt of aluminum or tannin may be added to the above materials in small proportions.

The invention enables all kinds of solid materials to be agglomerated. Among the softer materials may be mentioned paper, cork, and saw dust, and among the harder materials pebbles, mica and particles of metals or alloys.

Suitable coloring matter can of course be added.

Hitherto it has never been possible to add sufficient hardening material to a mixture of gelatine to render it substantially non absorbent, as is now possible by means of the present invention.

By experiments made at the Conservatoire National des Arts et Metiers at Paris, with an artificial stone brick it was found that the brick absorbed only 4.2 per cent of its own weight of water. Such a brick soaked in water was also frozen 25 times, without showing any traces of alteration.

Having now particularly described and ascertained the nature of my said invention and in what manner the same is to be performed, I declare that what I claim is:—

1. A process for agglomerating filler material, comprising, mixing the filler with plaster of Paris, then mixing with the result an aqueous solution of different kinds of gelatines such solution comprising water, bone gelatine, large sinew gelatine, small sinew gelatine, refined gelatine, bronze gelatine, and silver gelatine in approximately the proportions by weight of 1,000, 100, 80, 60, 40, 14, and 6 and then mixing with the result an aqueous solution of different kinds of gelatine hardeners, such solution comprising water, chrome alum, potash alum, bichromate of potash and formaldehyde in approximately the proportions by weight of 1, 76, 152, 57 and 114.

2. A process for agglomerating filler materials, comprising, mixing the filler with plaster of Paris in the relative approximate proportion by weight of 9 to 1, then mixing with the result an aqueous solution of different kinds of gelatines such solution comprising water, bone gelatine, large sinew gelatine, small sinew gelatine, refined gelatine, bronze gelatine, and silver gelatine in approximately the proportions by weight of 1000, 100, 80, 60, 40, 14 and 6 and then mixing with the result an aqueous solution of different kinds of gelatine hardeners, such solution comprising water, chrome alum, potash alum, bichromate of potash and formaldehyde in approximately the proportions by weight of 1, 76, 152, 57 and 114.

3. A process for agglomerating filler material, comprising, mixing the filler with plaster of Paris, then mixing with the result an aqueous solution of different kinds of gelatines such solution comprising water, bone gelatine, large sinew gelatine, small sinew gelatine, refined gelatine, bronze gelatine, and silver gelatine in approximately the proportions by weight of 1000, 100, 80, 60, 40, 14 and 6 and then mixing with the result an aqueous solution of different kinds of gelatine hardeners, such solution comprising water, chrome alum, potash alum, bichromate of potash and formaldehyde in approximately the proportions by weight of 1, 76, 152, 57 and 114, the gelatine and the gelatine hardener solutions being used in the approximate volumetric proportion of two to one.

4. A relatively hard tenacious non-hygroscopic material, comprising, a filler, a plurality of different kinds of gelatines, and a plurality of different kinds of hardeners, the gelatines including bone gelatine, large sinew gelatine, small sinew gelatine, refined gelatine, bronze gelatine and silver gelatine, and the gelatine hardeners including chrome alum, potash alum, bichromate of potash and formaldehyde, the various gelatines being in the approximate proportions by weight of 100, 80, 60, 40, 14 and 16 and the various gelatine hardeners being in the approximate proportions by weight of 76, 152, 57 and 114.

5. A relatively hard tenacious non-hygroscopic material, formed from a mixture of a filler, an approximately 30 per cent aqueous gelatine solution and an approximately 40 per cent aqueous gelatine hardener solution, to every 185 grams of filler there being approximately 18 cubic centimeters of the gelatine solution and 9 cubic centimeters of the hardener solution.

In testimony whereof I have signed my name to this specification.

ALEXANDRE SACHA BLACHOROVITCH.